United States Patent
Lai (10) Patent No.: US 11,842,545 B2
(45) Date of Patent: Dec. 12, 2023

(54) OBJECT COLLISION PREDICTION METHOD AND APPARATUS

(71) Applicant: HUAWEI TECHNOLOGIES CO., LTD., Shenzhen (CN)

(72) Inventor: Longzhen Lai, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 226 days.

(21) Appl. No.: 17/319,171

(22) Filed: May 13, 2021

(65) Prior Publication Data
US 2021/0264177 A1    Aug. 26, 2021

Related U.S. Application Data

(63) Continuation of application No. PCT/CN2019/109918, filed on Oct. 8, 2019.

(30) Foreign Application Priority Data

Dec. 16, 2018   (CN) .................. 201811538048.2

(51) Int. Cl.
*G06T 7/55*      (2017.01)
*G06V 20/58*     (2022.01)
*G06T 7/246*     (2017.01)
*G06T 7/70*      (2017.01)
(Continued)

(52) U.S. Cl.
CPC ......... *G06V 20/58* (2022.01); *B60W 30/0956* (2013.01); *G06T 7/248* (2017.01);
(Continued)

(58) Field of Classification Search
CPC .. G06T 7/55; G06T 7/70; G06T 7/248; G06T 2207/30256
See application file for complete search history.

(56) References Cited

U.S. PATENT DOCUMENTS

2014/0104408 A1   4/2014 Nanba
2015/0042799 A1*  2/2015 Zhang .................... G06V 20/58
                                                      348/148
(Continued)

FOREIGN PATENT DOCUMENTS

CN   101161524 A   4/2008
CN   104290753 A   1/2015
(Continued)

OTHER PUBLICATIONS

Liang-Chien Liu,"A Novel Distance Estimation Method Leading a Forward Collision Avoidance Assist System for Vehicles on Highways",LEEE Transactions on Intelligent Transportation Systems, vol. 18, No. 4, Apr. 2017,total 14 pages.
(Continued)

*Primary Examiner* — Myron Wyche
(74) *Attorney, Agent, or Firm* — RIMON P.C.

(57) ABSTRACT

This application provides a collision detection method and related apparatus. An image taken by a photographing unit may be used to predict whether a collision with a to-be-detected target will occur. In a current collision prediction method, a type of the to-be-detected target needs to be determined first based on the image taken by the photographing unit, which requires consuming of a large amount of computing power. In the collision prediction method provided in this application, a change trend of a distance between the to-be-detected target and a vehicle in which the apparatus is located may be determined based on the distances between the to-be-detected target and the vehicle at different moments, to predict a collision between the to-be-detected target and the vehicle. This method can improve efficiency in collision prediction and reduce energy consumption in predicting collision.

20 Claims, 7 Drawing Sheets

(51) Int. Cl.
    *B60W 30/095*     (2012.01)
    *G08G 1/16*     (2006.01)
    *G06V 20/56*     (2022.01)

(52) U.S. Cl.
    CPC .................. *G06T 7/55* (2017.01); *G06T 7/70* (2017.01); *G06V 20/588* (2022.01); *G08G 1/166* (2013.01); *G08G 1/167* (2013.01); *B60W 2420/42* (2013.01); *B60W 2552/53* (2020.02); *B60W 2554/4029* (2020.02); *G06T 2207/30256* (2013.01); *G06T 2207/30261* (2013.01); *G06V 2201/07* (2022.01)

(56) References Cited

U.S. PATENT DOCUMENTS

| | | | |
|---|---|---|---|
| 2015/0085119 A1 | 3/2015 | Dagan et al. | |
| 2017/0024898 A1* | 1/2017 | Spector | G06T 7/143 |
| 2018/0297590 A1 | 10/2018 | Kang et al. | |
| 2020/0079370 A1* | 3/2020 | Swope | G06T 7/596 |

FOREIGN PATENT DOCUMENTS

| | | |
|---|---|---|
| CN | 104392629 A | 3/2015 |
| CN | 106183979 A | 12/2016 |
| CN | 107139922 A | 9/2017 |
| CN | 107972662 A | 5/2018 |
| CN | 108021899 A | 5/2018 |
| CN | 108875603 A | 11/2018 |
| CN | 109472251 A | 3/2019 |

OTHER PUBLICATIONS

Bei Ren et al.,"Vision-based Forward Collision Warning System Design Supported by a Field-Test Verification Platform",2014 IEEE Intelligent Vehicles Symposium (IV),Jun. 8-11, 2014. Dearborn, Michigan, USA,total 6 pages.

Mahdi Rezaei et al.,"Robust Vehicle Detection and Distance Estimation Under Challenging Lighting Conditions",IEEE Transactions on Intelligent Transportation Systems, vol. XX, No. X, 2015,total 20 pages.

Ding Jieyun et al.,"Driver lane change decision analysis and intention recognition algorithm",Journal of Tsinghua University(Science and Technology), vol. 55, No. 7,with an English abstract,total 6 pages.

Wang Chao et al., "Vehicle collision model based on monovision",Journal of Nanjing University of Science and Technology, vol. 38, No. 6,Dec. 2014,with an English abstract,total 6 pages.

* cited by examiner

OBJECT COLLISION PREDICTION METHOD AND APPARATUS

CROSS-REFERENCE TO RELATED APPLICATIONS

This application is a continuation of International Application No. PCT/CN2019/109918, filed on Oct. 8, 2019, which claims priority to Chinese Patent Application No. 201811538048.2, filed on Dec. 16, 2018. The disclosures of the aforementioned applications are hereby incorporated by reference in their entireties.

TECHNICAL FIELD

This application relates to the field of image detection, and in particular, to a method for predicting an object collision by using images taken by a photographing unit, and related apparatus.

BACKGROUND

In an intelligent driver assistance system, a photographing unit is responsible for important sensing tasks, for example, obtaining environment information, which is used as a basis for a computing device inside the vehicle to identify an obstacle type and estimate the distance between the obstacle and the vehicle and the velocity of the vehicle. After obtaining the distance and the velocity of a to-be-detected target in front based on an image taken by the photographing unit, the computing device may further compare the velocity of the to-be-detected target with the velocity of the vehicle, determine whether the vehicle in which the computing device is located may collide with the to-be-detected target, and when determining that the to-be-detected target and the vehicle may collide, predict, based on a distance between the vehicle and the to-be-detected target, when the to-be-detected target and the vehicle will collide.

Currently, for estimating a distance between a vehicle in which a computing device is located and a to-be-detected target, usually a type of the to-be-detected target is first determined based on information such as an image taken by a photographing unit. For example, it is determined that the to-be-detected target is a pedestrian, a bicycle, a motorcycle, or a vehicle of a specific model. Then a real size of the type is obtained based on data of the type stored in a database by the computing device. The computing device further obtains, based on the real size of the type of the to-be-detected target and a size of the to-be-detected target in the image taken by the photographing unit, an actual distance between the to-be-detected target and the vehicle in which the computing device is located. Distances at different moments between the to-be-detected target and the vehicle in which the computing device is located are compared, and when the distance between the to-be-detected target and the vehicle is gradually decreasing, it is predicted that they may collide, or when the distance between the to-be-detected target and the vehicle is gradually increasing, it is predicted that they do not collide.

When collision prediction is performed by using the foregoing method, the type of the to-be-detected target needs to be first determined based on the image taken by the photographing unit, then the real size of the to-be-detected target is obtained from a prestored database based on the type of the to-be-detected target, and the distance between the to-be-detected target and the vehicle in which the computing device is located is obtained based on a ratio of the real size of the to-be-detected target to the size of the to-be-detected target in the image. Then, it is determined, based on a distance change trend, whether a collision may occur. In this way, a large amount of computing power is consumed for detecting the type of the to-be-detected target, and further, a specific amount of storage space is required to store the database.

SUMMARY

Embodiments of this application provide a method for predicting an object collision by using images taken by a photographing unit, and an apparatus, to resolve a prior-art problem that a large amount of computing power needs to be consumed for object collision prediction.

According to a first aspect, this application provides an object collision prediction method, where the method is applied to a computing device, and the computing device is located in an object including a photographing unit. The method includes: controlling the photographing unit to take a first image and a second image at a first moment and a second moment respectively, where the first image and the second image each include a to-be-detected target and the object, and the second moment is later than the first moment; measuring a first distance between the object and the to-be-detected target in the first image and a second distance between the object and the to-be-detected target in the second image; and predicting, based on the first distance and the second distance, whether the object collides with the to-be-detected target, that is, when the second distance is less than the first distance, predicting that the object collides with the to-be-detected target; or when the second distance is greater than or equal to the first distance, predicting that the object does not collide with the to-be-detected target.

According to the foregoing method, a change trend of the distance between the to-be-detected target and the object may be determined based on distances between the to-be-detected target and the object in images taken at different moments, to predict whether a collision occurs between the to-be-detected target and the object. Compared with the current technology, there is no need to consume a large amount of computing power for detecting a type of the to-be-detected target, thereby improving efficiency in performing collision prediction by the object, and reducing energy consumption for performing collision prediction by the object.

For the first aspect, in a possible implementation, when the second distance is less than the first distance, the method further includes: obtaining a relative velocity between the to-be-detected target and the object based on a difference between the second distance and the first distance and a difference between the second moment and the first moment; and predicting, based on the relative velocity and the second distance, a time in which the object collides with the to-be-detected target. According to the foregoing method, when it is predicted that the object may collide with the to-be-detected target, the relative velocity of the to-be-detected target and the object in the image may be further calculated, and the time in which the collision occurs is predicted based on the relative velocity. This may make a prediction result more specific, and helps the object or a controller of the object take measures to avoid the collision.

For the first aspect, in another possible implementation, the first moment and the second moment are as close as possible, for example, the first moment and the second moment respectively correspond to previous and next frames of an image captured by the photographing unit. This makes a calculated relative velocity between the to-be-detected target and the object closer to an instantaneous relative velocity of the to-be-detected target and the object at the second moment, so that the predicted time in which the collision occurs is more accurate.

For the first aspect, in another possible implementation, the predicting, based on the first distance and the second distance, whether the object collides with the to-be-detected target includes: calculating a location difference between the object and the first image in the second image; and predicting, based on the first distance and a sum of the second distance and the location difference, whether the object collides with the to-be-detected target. In this way, when the pitch angle of the object changes at the second moment due to jolting or acceleration/deceleration, the obtained second distance may be corrected, thereby making a prediction result more accurate.

For the first aspect, in another possible implementation, the measuring a first distance between the object and the to-be-detected target in the first image and a second distance between the object and the to-be-detected target in the second image includes: obtaining two-dimensional borders of the to-be-detected target in the first image and the second image; and measuring the first distance between the object and the two-dimensional border of the to-be-detected target in the first image and the second distance between the object and the two-dimensional border of the to-be-detected target in the second image. In the foregoing method, a distance between the two-dimensional borders of the to-be-detected target and the object is used as a distance between the to-be-detected target and the object, thereby making a result more accurate.

For the first aspect, in another possible implementation, when a distance between each pixel of a lower edge of the two-dimensional border of the to-be-detected target and the object is different, the shortest distance between a pixel included in the lower edge of the two-dimensional border of the to-be-detected target and the object is used as a distance between the object and the two-dimensional border of the to-be-detected target in the image. According to the foregoing method, the distance between the two-dimensional border of the to-be-detected target and the object in the image can be accurately measured, thereby improving reliability of a prediction result.

For the first aspect, in another possible implementation, the object is a vehicle, and the vehicle and the to-be-detected target are located in a same lane. The object mentioned in this application may be an object that requires collision prediction, such as a vehicle, a ship, or a robot. However, in this implementation, the object is defined as a vehicle, and the object is located in the same lane as the to-be-detected target. In this way, it is necessary to predict whether there is a possibility that the object collides with the to-be-detected target.

For the first aspect, in another possible implementation, lane lines in the first image and the second image are identified, where the lane lines include a first lane line and a second lane line, the first lane line and the second lane line are adjacent lane lines, and both the vehicle and the to-be-detected target are located between the first lane line and the second lane line. A transverse velocity of the to-be-detected target in the image is calculated based on a ratio of a distance between the to-be-detected target and the first lane line to a size of the two-dimensional border of the to-be-detected target in the first image and a ratio of a distance between the to-be-detected target and the first lane line to a size of the two-dimensional border of the to-be-detected target in the second image. A time in which the to-be-detected target leaves the current lane is predicted based on the ratio of the distance between the to-be-detected target and the first lane line to the size of the two-dimensional border of the to-be-detected target in the second image and the transverse velocity of the to-be-detected target. According to the foregoing method, the time in which the to-be-detected target leaves the current lane may be determined based on the transverse velocity of the to-be-detected target. When the time in which it takes the to-be-detected target to leave the current lane is less than the previously predicted time in which it takes the to-be-detected target to collide with the object, it is predicted that the collision will not happen, thereby making the prediction result more accurate.

According to a second aspect, this application provides a computing device, where the computing device is located on an object including a photographing unit. The computing device includes a control module, configured to control the photographing unit to shoot a first image and a second image at a first moment and a second moment respectively, where the first image and the second image each include a to-be-detected target and the object, and the second moment is later than the first moment; a processing module, configured to measure a first distance between the object and the to-be-detected target in the first image and a second distance between the object and the to-be-detected target in the second image; and a prediction module, configured to predict, based on the first distance and the second distance, whether the object collides with the to-be-detected target, that is, when the second distance is less than the first distance, predict that the object collides with the to-be-detected target, or when the second distance is greater than or equal to the first distance, predict that the object does not collide with the to-be-detected target.

For the second aspect, in a possible implementation, the prediction module is further configured to: when the second distance is less than the first distance, obtain a relative velocity between the to-be-detected target and the object based on a difference between the second distance and the first distance and a difference between the second moment and the first moment; and predict, based on the relative velocity and the second distance, a time in which the object collides with the to-be-detected target.

For the second aspect, in another possible implementation, when the prediction module predicts whether the object collides with the to-be-detected target, the prediction module is configured to: calculate a location difference between the object in the second image and the object in the first image; and predict, based on the first distance and a sum of the second distance and the location difference, whether the object collides with the to-be-detected target.

For the second aspect, in another possible implementation, when the processing module measures the first distance between the object and the to-be-detected target in the first image and the second distance between the object and the to-be-detected target in the second image, the processing module is configured to: obtain two-dimensional borders of the to-be-detected target in the first image and the second image; and measure the first distance between the object and the two-dimensional border of the to-be-detected target in the first image and the second distance between the object and the two-dimensional border of the to-be-detected target in the second image.

For the second aspect, in another possible implementation, the object is a vehicle, and the vehicle and the to-be-detected target are located in a same lane.

For the second aspect, in another possible implementation, the processing module is further configured to identify lane lines in the first image and the second image, where the lane lines include a first lane line and a second lane line, the first lane line and the second lane line are adjacent lane lines, and the vehicle and the to-be-detected target are located between the first lane line and the second lane line; and the prediction module is further configured to: calculate a transverse velocity of the to-be-detected target based on a ratio of a distance between the to-be-detected target and the first lane line to a size of the to-be-detected target in the first image and a ratio of a distance between the to-be-detected target and the first lane line to a size of the to-be-detected target in the second image; and predict, based on the ratio of the distance between the to-be-detected target and the first lane line to the size of the to-be-detected target in the second image and the transverse velocity of the to-be-detected target, a time in which the to-be-detected target leaves the current lane.

According to a third aspect, this application provides a computing device. The computing device includes a processor and a memory, the memory stores program code, and the processor is configured to invoke the program code in the memory to perform the collision prediction method according to the first aspect of this application.

DESCRIPTION OF EMBODIMENTS

In a current solution of predicting whether an image taken by a photographing unit collides with a to-be-detected target in front, a type of the to-be-detected target needs to be first identified. This requires the computing device to establish and maintain an enormous sample feature database, so as to ensure that the database has data of all possible types of the to-be-detected target. Then, image matching is performed, based on the database, on the image taken by a camera, to identify the to-be-detected target, and specifically, to identify a type of the to-be-detected target and the like. After the type of the to-be-detected target is identified, for example, it is identified that the to-be-detected target is a vehicle of a model A, a distance between the to-be-detected target and a vehicle in which the computing device is located may be determined by comparing an actual size, recorded in the database, of the vehicle of model A with a size of the to-be-detected target in the image taken by the photographing unit. Then, distances at different moments between the to-be-detected target and the vehicle in which the computing device is located are compared, and whether the to-be-detected target collides with the vehicle is predicted based on a distance change trend of the to-be-detected target and the vehicle.

In this way, an enormous sample feature database needs to be established, and an algorithm such as deep learning is used to identify the type of the to-be-detected target. Therefore, a large amount of computing resources and storage space needs to be consumed, and a relatively long delay is caused. In addition, it is difficult to accurately identify a type of an object for which no data is stored in the database, resulting in errors in subsequent distance calculations or even possible inability to obtain distances.

In the collision prediction technical solution provided in this application, a coordinate system is established in an image taken by a photographing unit, a border of a to-be-detected target is identified, and a distance between the border of the to-be-detected target and a vehicle in which a computing device is located is obtained. Herein, the distance is measured in pixels in the image. Distances, in the image at different moments, between the border of the to-be-detected target and the vehicle in which the computing device is located are compared, to determine a change trend of the distance between the border of the to-be-detected target and the vehicle, so as to predict whether the to-be-detected target collides with the vehicle.

Further, when a collision may occur, the computing device may further calculate a relative velocity between the to-be-detected target and the object in the image based on a time difference and a change between distances, in the image at different moments, between the border of the to-be-detected target and the vehicle in which the computing device is located; and predict, in real time based on the distance between the border of the to-be-detected target and the vehicle in the image, a time in which the collision occurs. In this method, whether a collision occurs between the to-be-detected target and the computing device can be predicted without identifying a type of the to-be-detected target and calculating an actual distance between the to-be-detected target and the vehicle in which the computing device is located, and when a collision may occur, a time in which the to-be-detected target collides with the vehicle may be predicted. Because the type of the to-be-detected target does not need to be identified, computing power and storage space occupied by a sample feature database can be saved.

Figure 1A:
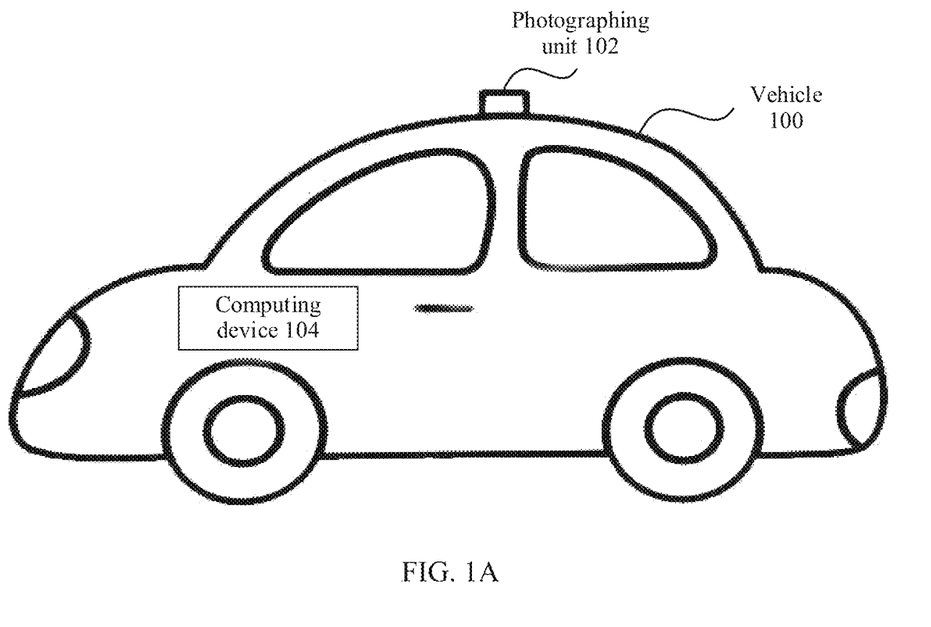
FIG. 1A is a schematic diagram of a possible system architecture according to an embodiment of this application.

FIG. 1A is a schematic diagram of a possible system architecture according to an embodiment of this application. As shown in FIG. 1A, the vehicle 100 includes a photographing unit 102 and a computing device 104. The photographing unit 102 is configured to collect an image, and may be a monocular photographing unit or a binocular photographing unit. In actual application, the photographing unit 102 may be any one of the following: an event data recorder, a camera, a camera apparatus, a camera device, or another device having a photographing function. The photographing unit 102 may be deployed in one or more of the following devices: the vehicle 100, the computing device 104, or another device (for example, a mobile phone or a computer). Herein, an example in which the photographing unit 102 is deployed in the vehicle 100 is used, which does not constitute a limitation.

The computing device 104 is configured to obtain an image taken by the photographing unit 102, identify a to-be-detected target in the image, and mark the identified to-be-detected target in the image using a two-dimensional border. The computing device 104 may be further configured to identify other environment information in the image, for example, to identify a lane line in the image. The computing device 104 is further configured to use a distance between a lower edge of the two-dimensional border of the to-be-detected target and a head part of the vehicle 100 as a distance between the to-be-detected target and the vehicle 100 in the image. The distance is measured in pixels, that is, the distance between the to-be-detected target and the vehicle 100 in the image is represented by a quantity of pixels between the to-be-detected target and the vehicle 100 in the image. Distances between the to-be-detected target and the vehicle 100 in the image at different moments are detected, and a change trend of the distances is analyzed, to predict whether the to-be-detected target will collide with the vehicle 100.

Figure 1B:
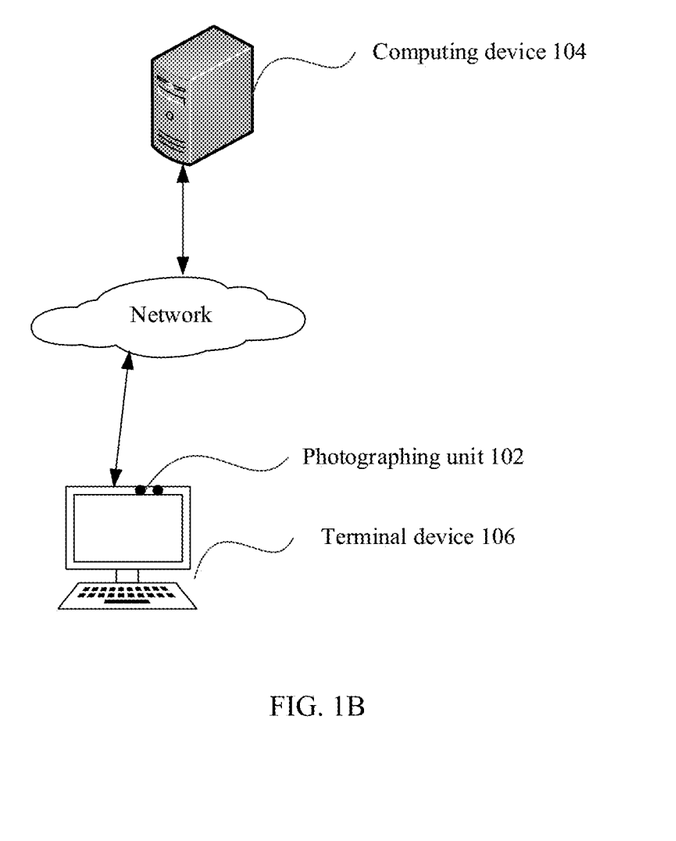
FIG. 1B is a schematic diagram of another possible system architecture according to an embodiment of this application.

In actual application, the computing device 104 may be deployed on the vehicle 100 for use, or may be independently deployed (for details, refer to an embodiment shown in FIG. 1B). This is not limited in the present invention. Herein, an example in which the computing device 104 is deployed in the vehicle 100 is used for illustration. The computing device includes but is not limited to any one of the following: a mobile phone, a tablet personal computer, a personal digital assistant (pPDA), and a mobile internet device (MID), a wearable device, an in-vehicle device, another device that supports network communications, and the like. It should be noted that, scenarios to which the present invention is applicable include but are not limited to autonomous driving, obstacle detection, and any other scenario that requires target detection.

In actual application, the vehicle 100 may include but is not limited to a truck, a van, a train, a car, a motorcycle, an off-road vehicle, a farm vehicle, or another vehicle or device. It should be noted that, for ease of description, the technical solutions in this application are described by using the vehicle 100 as a main object. However, in some embodiments of this application, the photographing unit 102 and the computing device 104 may also be installed on other entities that require collision prediction, to implement the technical solutions provided in this application. For example, the photographing unit 102 and the computing device 104 may be installed on a ship or robot to predict whether these entities collide with to-be-detected targets in front.

In this embodiment of the present invention, any two devices of the vehicle 100, the photographing unit 102, and the computing device 104 may implement inter-device network communication using a wired communications technology or a wireless communications technology. The wired communications technology may mean that two devices communicate with each other using a network cable, an optical fiber, or the like. The wireless communications technology includes but is not limited to a global system for mobile communications (GSM), a general packet radio service (GPRS), code division multiple access (CDMA), wideband code division multiple access (WCDMA), time-division code division multiple access (TD-SCDMA), long term evolution (LTE), a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like.

FIG. 1B is a schematic diagram of another possible system architecture according to an embodiment of this application. The system architecture includes a photographing unit 102 and a computing device 104.

The photographing unit 102 is deployed in a local terminal device 106. The terminal device includes but is not limited to a vehicle, a mobile phone, a tablet computer, a personal digital assistant (PDA), a mobile internet device (MID), a wearable device, and another device that supports network communication.

The computing device 104 is deployed on a cloud network side, for example, deployed on a cloud server as shown in FIG. 1B. The computing device 104 communicates, by using a network, with the terminal device on which the photographing unit 102 is deployed, to obtain an image collected by the photographing unit 102, and further implement collision detection on a to-be-detected target in the image. After completing collision detection on the to-be-detected target, the computing device may obtain a result of determining whether the to-be-detected target collides with the vehicle. Optionally, the computing device may send the determination of the to-be-detected target to the terminal device by using a network, so that the terminal device learns the determination result of the to-be-detected target. For details about content that is not described or shown in this embodiment of the present invention, refer to related descriptions in the embodiment in FIG. 1A. Details are not described herein again.

Figure 2:
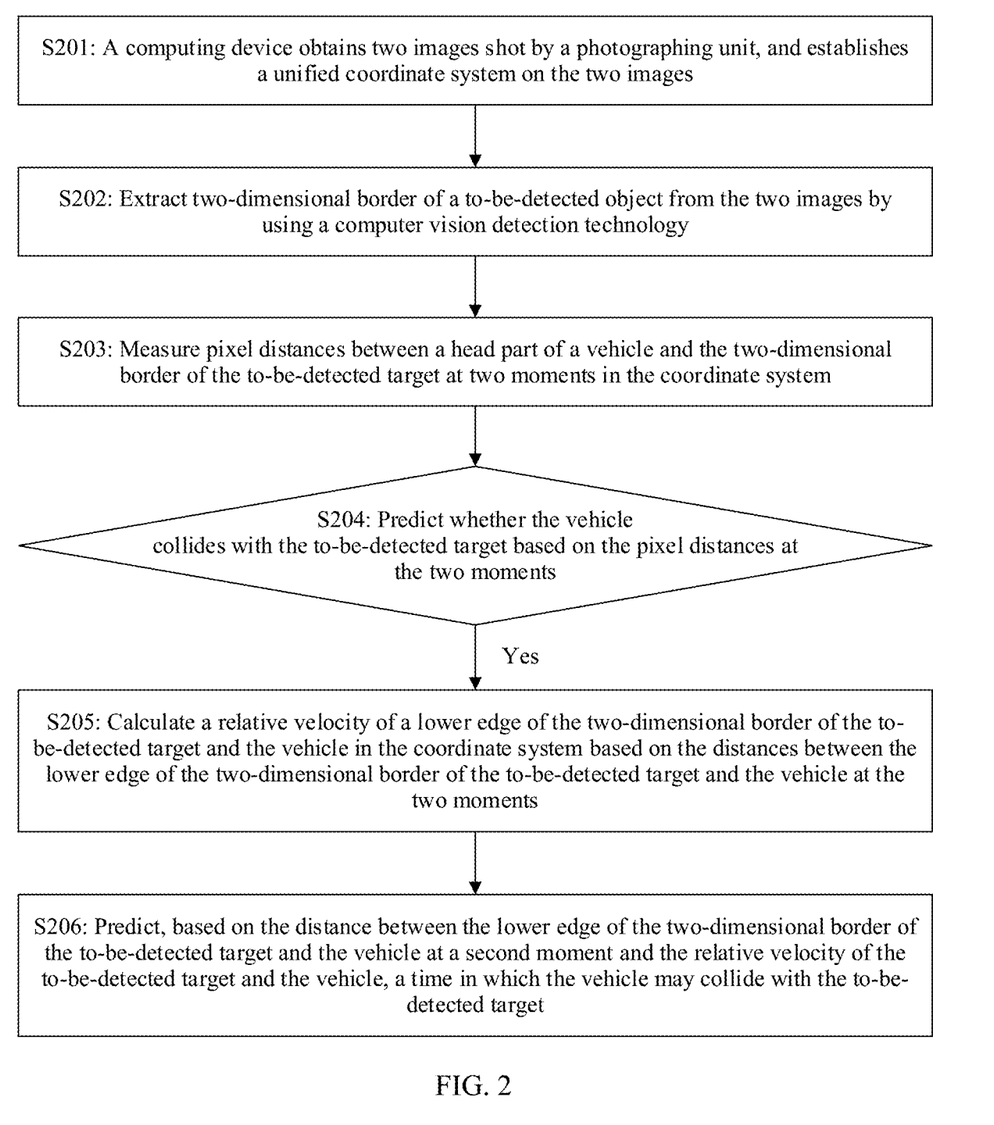
FIG. 2 is a schematic flowchart of an embodiment of this application.

FIG. 2 is a schematic flowchart of an embodiment of this application. As shown in FIG. 2, a collision prediction method provided in this application includes the following steps.

S201: A computing device 104 obtains two images taken by a photographing unit 102, and establishes a unified coordinate system on the two images.

The coordinate system uses a pixel as a length unit, and may use any point as an origin. This is not limited in this application. The computing device 104 controls the photographing unit 102 to shoot an image once at a preset interval, and records a time for shooting the image. The two images obtained by the computing device 104 may be images corresponding to two adjacent shooting times of the photographing unit 102, or may be images corresponding to shooting times with a preset interval. For ease of description, an earlier shooting time is used as a first moment, and a later shooting time is used as a second moment.

Figure 3:
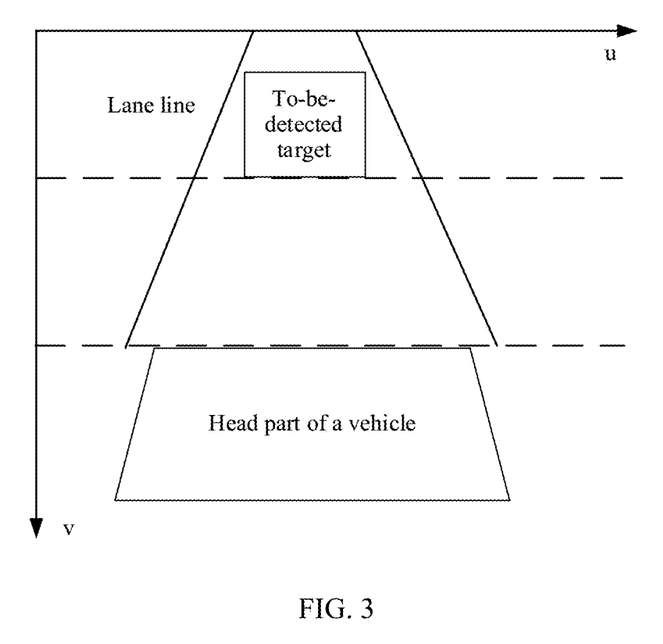
FIG. 3 is a schematic diagram of a possible image taken by the photographing unit.

FIG. 3 is a schematic diagram of a possible image taken by the photographing unit 102. As shown in the figure, a pixel in an upper left corner of the image is used as an origin, and a coordinate system with a u-axis as a horizontal axis and a v-axis as a vertical axis is established on the image. The coordinate system uses a pixel in the image as a length unit. That is, a quantity of pixels between entities is used as a distance between the entities in the image, and for ease of description, is referred to as a pixel distance below. The image includes a head part of the vehicle 100, a to-be-detected target, lane line information, and the like. The to-be-detected target may be an automobile, a bicycle, a pedestrian, or the like. That the to-be-detected target is an automobile is used for description in this application, but the type of the to-be-detected target is not limited.

S202: Extract two-dimensional borders of the to-be-detected target from the two images respectively using a computer vision detection technology.

The two-dimensional border of the to-be-detected target may be obtained by using a conventional vision algorithm such as image edge detection, or an algorithm such as deep learning. The image edge detection means that a status between each pixel and its neighborhood is detected to determine whether the pixel is located on a boundary of an object, so as to extract a set of pixels located on the boundary of the object to determine the border of the object. The image edge detection usually includes the following steps: First, perform image filtering. Conventional edge detection algorithms are mainly based on first-order and second-order derivatives of image intensity, but calculation of a derivative is sensitive to noise. Therefore, a filter needs to be used to improve performance of a noise-related edge detector. It should be noted that while capable of reducing noise, most filters cause edge strength loss. Therefore, a compromise needs to be made between edge enhancement and noise reduction. Second, perform image enhancement. A basis of edge enhancement is to determine the change of neighborhood intensity of each point in an image. The enhancement algorithm can be used to highlight points whose neighborhood intensity changes significantly. Edge enhancement is generally implemented by calculating gradient amplitudes. Third, perform image detection. In an image, gradient amplitudes of many points are large. However, these points are not all edge points in a specific application field. Therefore, a specific method should be used to determine which points are edge points. Simplest edge detection determination is based on gradient amplitude. Fourth, perform image positioning. If an edge position needs to be determined in an application scenario, the edge position may be estimated based on sub-pixel resolution.

The deep learning field has a plurality of algorithms used to identify a border of a to-be-detected target, including but not limited to any one or a combination of the following: a convolutional neural network (CNN), a region-based convolutional neural network (RCNN), and a you only look once (YOLO) neural network, a single shot multibox detector (SSD), a deep feedforward neural network (DFF), and a recursive neural network (RNN). This is not limited in this application.

S203: Respectively measure a distance between the head part of the vehicle 100 and a two-dimensional border of the to-be-detected target at a first moment in the coordinate system and a pixel distance between the head part of the vehicle 100 and a two-dimensional border of the to-be-detected target at a second moment in the coordinate system.

When the head part of the vehicle 100 comes into contact with a tail part of the to-be-detected target, it is considered that the vehicle 100 collides with the to-be-detected target. Therefore, a pixel distance between the head part of the vehicle 100 and a lower edge of the two-dimensional border of the to-be-detected target in the coordinate system is used as a distance between the vehicle 100 and the to-be-detected target in the image.

A v-coordinate of the head part of the vehicle 100 in the image corresponding to the first moment is a0. For a v-coordinate of the lower edge of the two-dimensional border of the to-be-detected target, when the lower edge of the two-dimensional border of the to-be-detected target shown in FIG. 3 is parallel to the u-axis, v-coordinates of all pixels of the lower edge of the two-dimensional border of the to-be-detected target are the same. Therefore, this coordinate is used as the v-coordinate a1 of the lower edge of the two-dimensional border of the to-be-detected target at the first moment.

Figure 4:
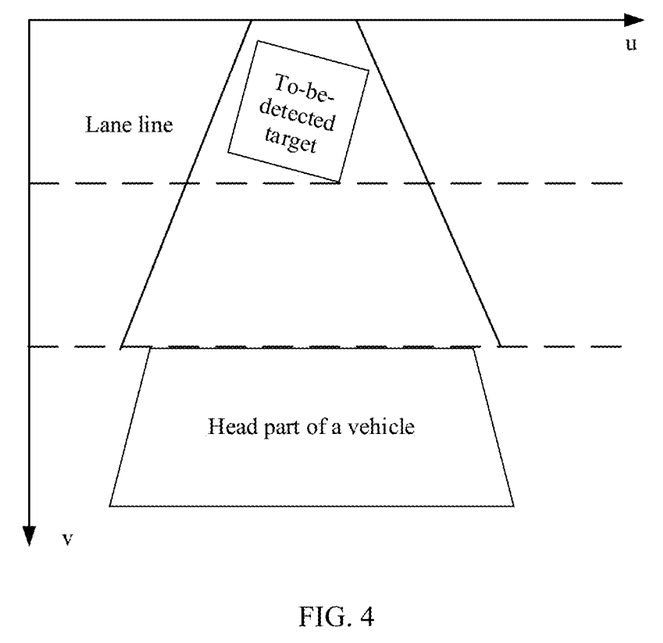
FIG. 4 is a schematic diagram of another possible image taken by the photographing unit.

FIG. 4 is a schematic diagram of another possible image taken by the photographing unit 102. As shown in FIG. 4, when the lower edge of the two-dimensional border of the to-be-detected target is not parallel to the u-axis, v-coordinates of all pixels on the lower edge of the two-dimensional border of the to-be-detected target are different. In this case, a pixel with a largest v-coordinate should be selected, and this pixel is the closest to the vehicle head part of the vehicle 100. The v-coordinate of the pixel is used as the v-coordinate value a1 of the lower edge of the two-dimensional border of the to-be-detected target at the first moment.

After the v-coordinates of the head part of the vehicle 100 and the lower edge of the two-dimensional border of the to-be-detected target at the first moment are obtained, a pixel distance s1=a0−a1 between the vehicle 100 and the to-be-detected target at the first moment t1 is calculated.

Similarly, a v-coordinate a2 of the head part of the vehicle 100 at the second moment and a v-coordinate a3 of the lower edge of the two-dimensional border of the to-be-detected target are obtained according to the foregoing method, and a pixel distance s2=a2−a3 between the vehicle 100 and the to-be-detected target at the second moment t2 is calculated.

It should be noted that, for the distance between the vehicle 100 and the to-be-detected target in the image, the distance between the head part of the vehicle 100 and the lower edge of the two-dimensional border of the to-be-detected target is used in this application. There may be a plurality of methods to express the distance between the vehicle 100 and the to-be-detected target in the image. This is not limited in this application.

S204: Predict, based on the pixel distances between the vehicle 100 and the lower edge of the two-dimensional border of the to-be-detected target at the first moment and the second moment, whether the vehicle 100 and the to-be-detected target may collide.

When the pixel distance s1 between the vehicle 100 and the lower edge of the two-dimensional border of the to-be-detected target at the first moment is less than or equal to the pixel distance s2 at the second moment, it indicates that the distance between the vehicle 100 and the lower edge of the two-dimensional border of the to-be-detected target is increasing or remains unchanged. In this case, the computing device 104 predicts that the vehicle 100 and the to-be-detected target do not collide, and the process ends.

When the pixel distance s1 between the vehicle 100 and the lower edge of the two-dimensional border of the to-be-detected target at the first moment is greater than the pixel distance s2 at the second moment, it indicates that the distance between the vehicle 100 and the lower edge of the two-dimensional border of the to-be-detected target is decreasing. In this case, the computing device 104 predicts that the vehicle 100 and the to-be-detected target may collide, and continues to perform step S205.

S205: Calculate a relative velocity of the to-be-detected target and the vehicle 100 in the coordinate system based on the distances between the lower edges of the two-dimensional border of the to-be-detected target and the vehicle 100 at the first moment and the second moment.

The relative velocity $v1=(s2-s1)/(t2-t1)$ of the vehicle 100 and the to-be-detected target between the first moment and the second moment may be obtained through calculation based on the distance s2 between the lower edge of the two-dimensional border of the to-be-detected target and the vehicle 100 at the first moment, the distance s2 between the lower edge of the two-dimensional border of the to-be-detected target and the vehicle 100 at the second moment, and a time difference (t2−t1) between the first moment and the second moment. Herein, t1 and t2 respectively indicate a time of the first moment and a time of the second moment.

Optionally, when an interval between the first moment and the second moment is small enough, especially when the first moment and the second moment are respectively previous and next frame images taken by the photographing unit 102, the relative velocity v1 calculated by using the foregoing method is closer to an instantaneous relative velocity of the vehicle 100 and the to-be-detected target at the second moment, and the relative velocity v1 may be more accurate for subsequent prediction on a time in which the vehicle 100 may collide with the to-be-detected target.

S206: Predict, based on the distance s2 between the lower edge of the two-dimensional border of the to-be-detected target and the vehicle 100 at the second moment and the relative velocity v1 of the to-be-detected target and the vehicle 100, a time in which the vehicle 100 may collide with the to-be-detected target.

The computing device 104 may calculate, based on the distance s2 between the lower edge of the two-dimensional border of the to-be-detected target and the vehicle at the second moment and the relative velocity v1 between the vehicle 100 and the to-be-detected target, the time $|t=s2/v1|$ in which the vehicle 100 may collide with the to-be-detected target, namely, an absolute value of a result of dividing the distance s2 by the relative velocity v1. The time represents a time in which the vehicle 100 and the to-be-detected target collide if they both keep the current velocities. With reference to step S205, when the interval between the first moment and the second moment is small enough, the relative velocity v1 is closer to the instantaneous relative velocity of the vehicle 100 and the to-be-detected target at the second moment, and a time in which the vehicle 100 and the to-be-detected target collide at the current velocities is predicted more accurately. In addition, if the velocities of the vehicle 100 and the to-be-detected target change subsequently, the relative velocity between the vehicle 100 and the to-be-detected target change accordingly, and the computing device 104 may also calculate, based on a pixel distance between the lower edge of the two-dimensional border of the current to-be-detected target and the vehicle 100 and an instantaneous relative velocity of the vehicle 100 and the to-be-detected target, a time in which the vehicle 100 and the to-be-detected target collide.

Optionally, when the time predicted by the computing device 104, in which the vehicle 100 and the to-be-detected target may collide, is less than a specified threshold, the computing device 104 may perform a specific operation according to a specified program. For example, when the specified threshold is three seconds, if the computing device 104 predicts that, at the current vehicle velocity, the vehicle 100 will collide with the to-be-detected target within two seconds, the computing device 104 may control the vehicle to decelerate when a driving condition allows, or sound a whistle to alert the to-be-detected target in front, or remind a driver of the vehicle 100 to intervene in driving control. This is not limited in this application.

Optionally, because a pitch angle of the vehicle 100 may change due to jolting, acceleration/deceleration, and the like when the vehicle 100 is running, the foregoing calculation result may deviate from the true distance or speed. To make calculation more accurate, before the difference between the pixel distances between the vehicle 100 and the lower edge of the two-dimensional border of the to-be-detected target at the second moment and the first moment is calculated in steps such as S204, data corresponding to the second moment may be first corrected based on data corresponding to the first moment.

Specifically, because the photographing unit 102 is located in the vehicle 100, theoretically the v-coordinate a0 of the head part of the vehicle 100 at the first moment is the same as the v-coordinate a2 of the head part of the vehicle 100 at the second moment. When a0 and a2 are different, if the data corresponding to the first moment is used as a reference, it indicates that the pitch angle of the vehicle 100 changes at the second moment because of jolting, acceleration/deceleration, and the like. A distance between the lower edge of the two-dimensional border of the to-be-detected target photographed by the photographing unit 102 and the vehicle 100 when a vehicle head of the vehicle 100 is inclined upward at the second moment is greater than a distance when the vehicle head is kept horizontal. Therefore, a positive compensation amount δ needs to be added to the v-coordinate a3 of the lower edge of the two-dimensional border of the to-be-detected target at the second moment, that is, a positive compensation amount is deducted from the distance s2 between the lower edge of the two-dimensional border of the to-be-detected target and the vehicle 100 at the second moment. A distance between the lower edge of the two-dimensional border of the to-be-detected target photographed by the photographing unit 102 and the vehicle 100 when the vehicle head of the vehicle 100 is inclined downward at the second moment is smaller than a distance when the vehicle head is kept horizontal. Therefore, a negative compensation amount needs to be added to the v-coordinate a3 of the lower edge of the two-dimensional border of the to-be-detected target at the second moment, that is, a negative compensation amount needs to be deducted from the distance s2 of the lower edge of the two-dimensional border of the to-be-detected target and the vehicle 100 at the second moment, and subsequent calculation is performed based on the modified distance at the second moment.

Optionally, a difference between the v-coordinate a2 of the head part of the vehicle 100 at the second moment and the v-coordinate a0 of the head part of the vehicle 100 at the first moment may be used as the compensation amount δ, that is, $\delta = a2 - a0$. When the vehicle head of the vehicle 100 is inclined upward at the second moment, the v-coordinate a2 of the vehicle head part is greater than a0, and the compensation amount δ is a positive value. When the vehicle head of the vehicle 100 is inclined downward at the second moment, the v-coordinate a2 of the head part is less than a0, and the compensation amount δ is a negative value. In this application, the distance s2 between the lower edge of the two-dimensional border of the to-be-detected target and the vehicle 100 at the second moment may be corrected using the foregoing algorithm, thereby making a calculation result more accurate. It should be noted that the correction of the distance s2 between the lower edge of the two-dimensional border of the to-be-detected target and the vehicle 100 at the second moment is not limited to the foregoing method. This is not limited in this application.

The foregoing description of the embodiments of this application is given by using the vehicle 100 as a main object. It should be noted that the technical solution provided in the embodiments of this application may be applied not only to the field of intelligent vehicle driving, but also to the fields of robots, ships, and the like as a technical solution of collision prediction. The application scenarios are not limited in this application.

Figure 5:
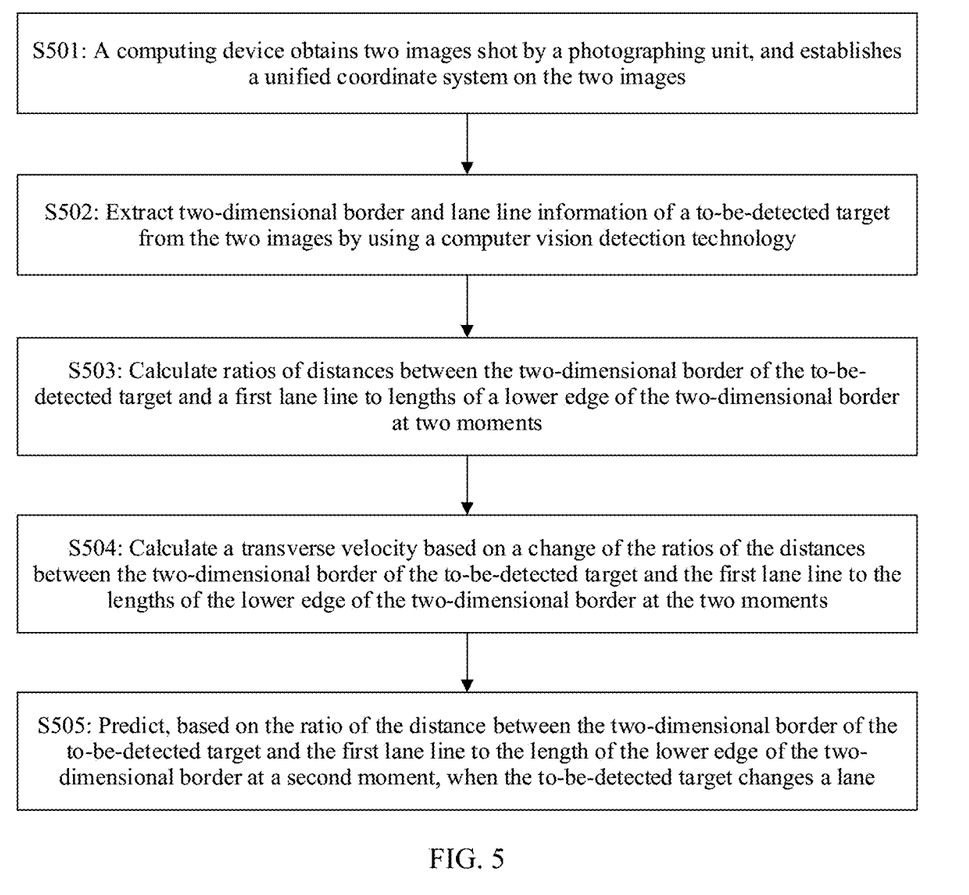
FIG. 5 is a schematic flowchart of another embodiment of this application.

FIG. 5 is a schematic flowchart of another embodiment of this application.

In the schematic flowchart shown in FIG. 2, this application provides a solution of predicting whether a vehicle 100 collides with a to-be-detected target in front and a time when a collision occurs. If the to-be-detected target is changing lanes, and a time used for changing the lane is less than a time that is predicted for the vehicle 100 to collide with the to-be-detected target, even if both the vehicle 100 and the to-be-detected target keep current velocities, they will not collide. As shown in FIG. 5, this embodiment includes the following steps:

S501: A computing device 104 obtains two images taken by a photographing unit 102, and establishes a unified coordinate system on the two images.

S502: Extract two-dimensional borders and lane line information of a to-be-detected target from the two images by using a computer vision detection technology.

The two-dimensional borders of the to-be-detected target and lane line information of a lane in which the to-be-detected target and the vehicle 100 are located are extracted from the two images by using the computer vision detection technology described in detail in step S202, where the to-be-detected target is located between a first lane line and a second lane line. The first lane line may be used to represent a lane line on the left of the to-be-detected target, and the second lane line may be used to represent a lane line on the right of the to-be-detected target. Alternatively, the first lane line may be used to represent a lane line on the right of the to-be-detected target, and the second lane may be used to represent a lane line on the left of the to-be-detected target. This is not limited in this application.

S503: Calculate ratios r1 and r2 of distances between the two-dimensional borders of the to-be-detected target and the first lane line and to lengths of a lower edge of the two-dimensional border at the first moment and the second moment.

A size of an object that is farther away from the photographing unit 102 appears smaller in an image taken by the photographing unit 102. Therefore, when a distance between the to-be-detected target and the vehicle 100 changes, both the size of the two-dimensional border of the to-be-detected target in the image and the distance between the two-dimensional border of the to-be-detected target and a lane line change accordingly. To resolve this problem, in this application, calculation is performed by using the ratio r1 of the distance between the two-dimensional border of the to-be-detected target and the first lane line to the length of the lower edge of the two-dimensional border of the to-be-detected target. This may eliminate impact on a calculation result caused by a change of a size of the to-be-detected target in the image due to a difference in distances between the to-be-detected target and the photographing unit 102. Similarly, a ratio of the distance between the two-dimensional border of the to-be-detected target and the first lane line to another size of the two-dimensional border of the to-be-detected target may be alternatively selected for calculation. This is not limited in this application.

Because it is considered that the to-be-detected target has completed lane change only when the to-be-detected target completely leaves the lane in which the to-be-detected target is located, in this embodiment, a pixel that is of the two-dimensional border of the to-be-detected target and that has a largest distance to the first lane line should be selected, and the distance between the pixel and the first lane line is considered as the distance between the two-dimensional border of the to-be-detected target and the first lane line. Specifically, when the to-be-detected target changes a lane to the left, a left lane line is used as the first lane line, and a distance between a right edge of the two-dimensional border of the to-be-detected target and the first lane line is used as the distance between the two-dimensional border of the to-be-detected target and the first lane line. When the to-be-detected target changes a lane to the right, a right lane line is used as the first lane line, and a distance between a left edge of the two-dimensional border of the to-be-detected target and the first lane line is used as the distance between the two-dimensional border of the to-be-detected target and the first lane line.

Similarly, the distance between the two-dimensional border of the to-be-detected target and the first lane line at the second moment is obtained, and the ratio r2 of the distance between the two-dimensional border of the to-be-detected target and the first lane line at the second moment to the length of the lower edge of the two-dimensional border is calculated.

S504: Calculate a transverse velocity v2 of the to-be-detected target based on a change of the ratios of the distances between the two-dimensional border of the to-be-detected target and the first lane line to the lengths of the lower edge of the two-dimensional border at the first moment and the second moment.

The transverse velocity $v2=(r2-r1)/(t2-t1)$ of the to-be-detected target may be obtained based on the ratio r1 of the distance between the two-dimensional border of the to-be-detected target and the first lane line to the length of the lower edge of the two-dimensional border at the first moment, the ratio r2 of the distance between the two-dimensional border of the to-be-detected target and the first lane line to the length of the lower edge of the two-dimensional border at the second moment, and a time difference $(t2-t1)$ between the second moment and the first moment.

Optionally, when an interval between the first moment and the second moment is small enough, especially when the first moment and the second moment are respectively previous and next frame images taken by the photographing unit 102, the transverse velocity v2 of the to-be-detected target calculated by using the foregoing method is closer to an instantaneous transverse velocity of the to-be-detected target at the second moment, and the transverse velocity v2 may be more accurate for subsequent prediction on a time in which the to-be-detected target completes lane change.

S505: Predict, based on the ratio of the distance between the two-dimensional border of the to-be-detected target and the first lane line to the length of the lower edge of the two-dimensional border of the to-be-detected target at the second moment and the transverse velocity of the to-be-detected target, when the to-be-detected target completes lane change.

The distance between the two-dimensional border of the to-be-detected target and the first lane line is defined in this embodiment as a distance between the first lane line and a pixel that is of the two-dimensional border of the to-be-detected target and that has a largest distance to the first lane line. Therefore, a time in which the to-be-detected target completely leaves the lane may be obtained based on the distance and the transverse velocity of the to-be-detected target. With reference to the time in which the vehicle 100 collides with the to-be-detected target as predicted in step S206, if the time in which the to-be-detected target completely leaves the lane is less than the time in which the vehicle 100 collides with the to-be-detected target, it may be predicted that the to-be-detected target and the vehicle 100 do not collide when they both keep current velocities.

Figure 6:
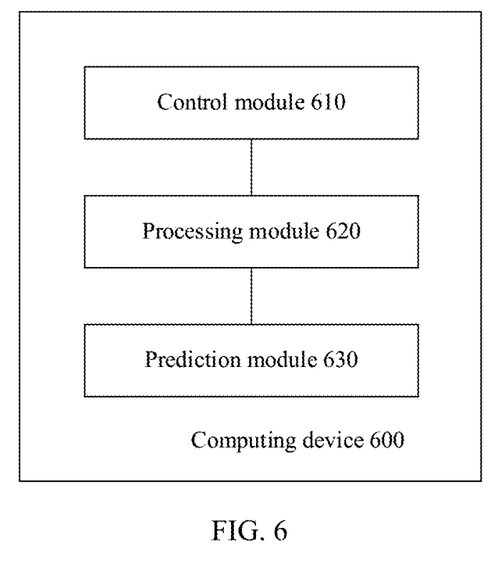
FIG. 6 is a schematic diagram of a functional structure of a computing device according to an embodiment of this application.

FIG. 6 is a schematic diagram of a functional structure of a computing device used for collision prediction according to an embodiment of this application. The computing device is located in an object that includes a photographing unit. As shown in FIG. 6, the computing device 600 includes a control module 610, a processing module 620, and a prediction module 630.

The control module 610 is configured to shoot a first image and a second image at a first moment and a second moment respectively, where the first image and the second image each include a to-be-detected target and the object, and the second moment is later than the first moment.

The processing module 620 is configured to measure a first distance between the object and the to-be-detected target in the first image and a second distance between the object and the to-be-detected target in the second image.

The prediction module 630 is configured to predict, based on the first distance and the second distance, whether the object collides with the to-be-detected target. To be specific, when the second distance is less than the first distance, it is predicted that the object collides with the to-be-detected target; or when the second distance is greater than or equal to the first distance, it is predicted that the object does not collide with the to-be-detected target.

The computing device 600 is further configured to perform other steps of collision prediction shown in FIG. 2 and FIG. 5. Specifically, the control module 610 is configured to perform the operation of controlling the photographing unit to shoot an image in steps S201 and S501, the processing module 620 is configured to perform the operation of establishing a coordinate system in steps S201 and S501, and steps S202, S203, S502, and S503, and the prediction module 630 is configured to perform steps S204, S205, S206, S504, and S505. Details are not described herein.

Figure 7:
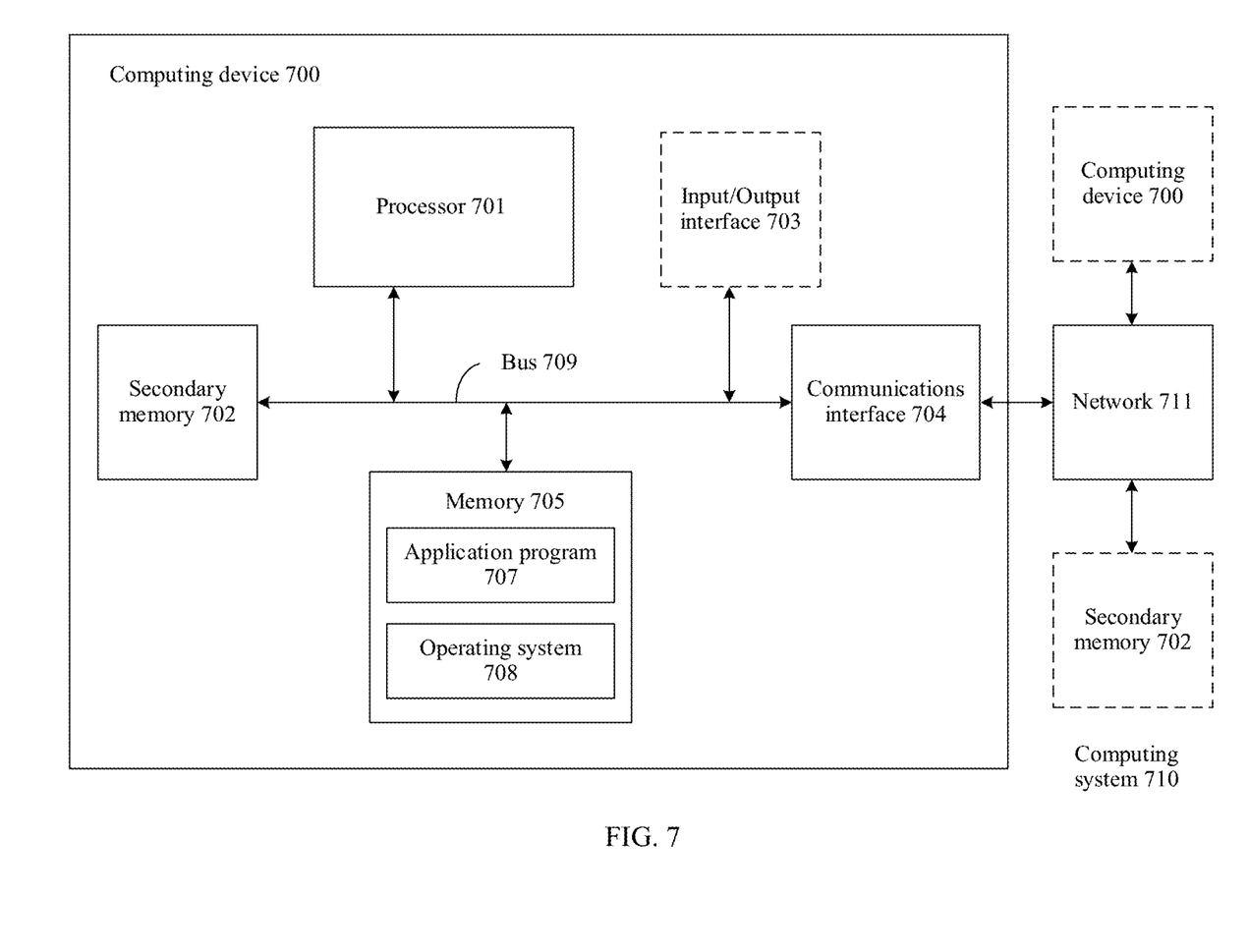
FIG. 7 is a schematic structural diagram of a computing device according to an embodiment of this application.

FIG. 7 is a schematic structural diagram of a computing device 700 for collision prediction according to an embodiment of this application. The computing device 700 in this embodiment may be one example implementation of a system in the foregoing embodiments.

As shown in FIG. 7, the computing device 700 includes a processor 701, and the processor 701 is connected to a memory 705. The processor 701 may be computational logic such as a field programmable gate array (FPGA), a digital signal processor (DSP), or a combination of any computational logic. The processor 701 may be a single-core processor or a multi-core processor.

The memory 705 may be a RAM memory, a flash memory, a ROM memory, an EPROM memory, an EEPROM memory, a register, or a storage medium in any other form known in the art. The memory may be configured to store a program instruction. When the program instruction is executed by the processor 701, the processor 701 performs the method in the foregoing embodiment.

A bus connection 709 is configured to transfer information between components of a communications apparatus. The bus connection 709 may be connected in a wired connection manner or a wireless connection manner. This is not limited in this application. The connection 709 is further connected to a network interface 704.

The network interface 704 implements communication with another device or a network 711 by using, for example but not limited to, a connection apparatus such as a cable or an electrical twisted wire. The network interface 704 may also be interconnected with the network 711 in a wireless manner.

Some features in this embodiment of this application may be implemented/supported by the processor 701 by executing a program instruction or software code in the memory 705. Software components loaded on the memory 705 may be summarized in terms of functions or logic, for example, the control module, the processing module, and the prediction module shown in FIG. 6.

In an embodiment of this application, after the memory 705 loads the program instruction, the processor 701 executes a transaction related to the foregoing function/logical module in the memory.

In addition, FIG. 7 shows merely an example of a computing device 700. The computing device 700 may include more or fewer components than those shown in FIG. 7, or may have different component configuration manners. In addition, various components shown in FIG. 7 may be implemented by hardware, software, or a combination of hardware and software. For example, the memory and the processor may be implemented in one module. An instruction in the memory may be written into the memory in advance, or may be loaded in a subsequent execution process of the processor.

The invention claimed is:

1. An object collision prediction method, wherein the method is applied to a computing device, the computing device is located in an object comprising a photographing unit, and the method comprises:
   adjusting the photographing unit so that images taken by the photographing unit include a front portion of the object;
   controlling the photographing unit to shoot a first image and a second image at a first moment and a second moment respectively, wherein the first image and the second image each comprise a to-be-detected target and the front portion of the object, and the second moment is later than the first moment;
   measuring a first distance between the object and the to-be-detected target in the first image and a second distance between the object and the to-be-detected target in the second image; and
   predicting, based on the first distance and the second distance, whether the object collides with the to-be-detected target.

2. The method according to claim 1, wherein when the second distance is less than the first distance, the method further comprises:
   obtaining a relative velocity between the to-be-detected target and the object based on a difference between the second distance and the first distance and a difference between the second moment and the first moment; and
   predicting, based on the relative velocity and the second distance, a time in which the object collides with the to-be-detected target.

3. The method according to claim 1, wherein the predicting, based on the first distance and the second distance, whether the object collides with the to-be-detected target comprises:
   calculating a location difference between the object in the second image and the object in the first image; and
   predicting, based on the first distance and a sum of the second distance and the location difference, whether the object collides with the to-be-detected target.

4. The method according to claim 1, wherein the measuring a first distance between the object and the to-be-detected target in the first image and a second distance between the object and the to-be-detected target in the second image comprises:
   obtaining two-dimensional borders of the to-be-detected target in the first image and the second image; and
   measuring the first distance between the object and the two-dimensional borders of the to-be-detected target in the first image and the second distance between the object and the two-dimensional border of the to-be-detected target in the second image.

5. The method according to claim 4, wherein when a distance between each pixel of a lower edge of the two-dimensional border of the to-be-detected target and the object is different, a shortest distance between a pixel comprised in the lower edge of the two-dimensional border of the to-be-detected target and the object is used as a distance between the object and the two-dimensional border of the to-be-detected target in the image.

6. The method according to claim 1, wherein
the object is a vehicle, and the vehicle and the to-be-detected target are located in a same lane.

7. The method according to claim 6, wherein the method further comprises:
identifying lane lines in the first image and the second image, wherein the lane lines comprise a first lane line and a second lane line, the first lane line and the second lane line are adjacent lane lines, and the vehicle and the to-be-detected target are located between the first lane line and the second lane line;
calculating a transverse velocity of the to-be-detected target based on a ratio of a distance between the to-be-detected target and the first lane line to a size of the to-be-detected target in the first image and a ratio of a distance between the to-be-detected target and the first lane line to a size of the to-be-detected target in the second image; and
predicting, based on the ratio of the distance between the to-be-detected target and the first lane line to the size of the to-be-detected target in the second image and the transverse velocity of the to-be-detected target, a time in which the to-be-detected target leaves the current lane.

8. A computing device, wherein the computing device is located in an object comprising a photographing unit, and the computing device comprises:
a processor; and
a computer-readable storage medium coupled to the processor and storing programming instructions for execution by the processor, wherein the programming instructions instruct the processor to control the photographing unit to shoot a first image and a second image at a first moment and a second moment respectively, wherein the first image and the second image each comprise a to-be-detected target and the object, and the second moment is later than the first moment;
measure a first distance between the object and the to-be-detected target in the first image and a second distance between the object and the to-be-detected target in the second image; and
predict, based on the first distance and the second distance, whether the object collides with the to-be-detected target.

9. The computing device according to claim 8, wherein the programming instructions instruct the processor to:
when the second distance is less than the first distance, obtain a relative velocity between the to-be-detected target and the object based on a difference between the second distance and the first distance and a difference between the second moment and the first moment; and
predict, based on the relative velocity and the second distance, a time in which the object collides with the to-be-detected target.

10. The computing device according to claim 8, wherein the programming instructions instruct the processor to:
calculate a location difference between the object in the second image and the object in the first image; and
predict, based on the first distance and a sum of the second distance and the location difference, whether the object collides with the to-be-detected target.

11. The computing device according to claim 8, wherein the programming instructions instruct the processor to:
obtain two-dimensional borders of the to-be-detected target in the first image and the second image; and
measure the first distance between the object and the two-dimensional border of the to-be-detected target in the first image and the second distance between the object and the two-dimensional border of the to-be-detected target in the second image.

12. The computing device according to claim 8, wherein the object is a vehicle, and the vehicle and the to-be-detected target are located in a same lane.

13. The computing device according to claim 12, wherein the programming instructions instruct the processor to:
identify lane lines in the first image and the second image, wherein the lane lines comprise a first lane line and a second lane line, the first lane line and the second lane line are adjacent lane lines, and the vehicle and the to-be-detected target are located between the first lane line and the second lane line; and
calculate a transverse velocity of the to-be-detected target based on a ratio of a distance between the to-be-detected target and the first lane line to a size of the to-be-detected target in the first image and a ratio of a distance between the to-be-detected target and the first lane line to a size of the to-be-detected target in the second image; and
predict, based on the ratio of the distance between the to-be-detected target and the first lane line to the size of the to-be-detected target in the second image and the transverse velocity of the to-be-detected target, a time in which the to-be-detected target leaves the current lane.

14. A non-transitory computer readable medium comprising computer program codes stored thereon, executable by one or more processors for an object collision prediction, the computer program codes including:
instructions for controlling the photographing unit to shoot a first image and a second image at a first moment and a second moment respectively, wherein the first image and the second image each comprise a to-be-detected target and the object, and the second moment is later than the first moment;
instructions for measuring a first distance between the object and the to-be-detected target in the first image and a second distance between the object and the to-be-detected target in the second image; and
instructions for predicting, based on the first distance and the second distance, whether the object collides with the to-be-detected target.

15. The non-transitory computer readable medium according to claim 14, the computer program codes including:
instructions for obtaining a relative velocity between the to-be-detected target and the object based on a difference between the second distance and the first distance and a difference between the second moment and the first moment when the second distance is less than the first distance; and
instructions for predicting, based on the relative velocity and the second distance, a time in which the object collides with the to-be-detected target.

16. The non-transitory computer readable medium according to claim 14, the instructions for predicting, based on the first distance and the second distance, whether the object collides with the to-be-detected target comprises:
instructions for calculating a location difference between the object in the second image and the object in the first image; and instructions for predicting, based on the first distance and a sum of the second distance and the location difference, whether the object collides with the to-be-detected target.

17. The non-transitory computer readable medium according to claim 14, the instructions for measuring a first distance between the object and the to-be-detected target in the first image and a second distance between the object and the to-be-detected target in the second image comprises:
  instructions for obtaining two-dimensional borders of the to-be-detected target in the first image and the second image; and
  instructions for measuring the first distance between the object and the two dimensional borders of the to-be-detected target in the first image and the second distance between the object and the two-dimensional border of the to-be-detected target in the second image.

18. The non-transitory computer readable medium according to claim 17, wherein when a distance between each pixel of a lower edge of the two-dimensional border of the to-be-detected target and the object is different, a shortest distance between a pixel comprised in the lower edge of the two-dimensional border of the to-be-detected target and the object is used as a distance between the object and the two-dimensional border of the to-be-detected target in the image.

19. The non-transitory computer readable medium according to claim 14, wherein the object is a vehicle, and the vehicle and the to-be-detected target are located in a same lane.

20. The non-transitory computer readable medium according to claim 19, the computer program codes including:
  instructions for identifying lane lines in the first image and the second image, wherein the lane lines comprise a first lane line and a second lane line, the first lane line and the second lane line are adjacent lane lines, and the vehicle and the to-be-detected target are located between the first lane line and the second lane line;
  instructions for calculating a transverse velocity of the to-be-detected target based on a ratio of a distance between the to-be-detected target and the first lane line to a size of the to-be-detected target in the first image and a ratio of a distance between the to-be-detected target and the first lane line to a size of the to-be-detected target in the second image; and
  instructions for predicting, based on the ratio of the distance between the to-be detected target and the first lane line to the size of the to-be-detected target in the second image and the transverse velocity of the to-be-detected target, a time in which the to-be-detected target leaves the current lane.

* * * * *